Dec. 15, 1936.   W. W. SAYERS   2,064,497
SETTLING TANK FOR SEWAGE AND THE LIKE
Filed Feb. 18, 1933   8 Sheets-Sheet 4
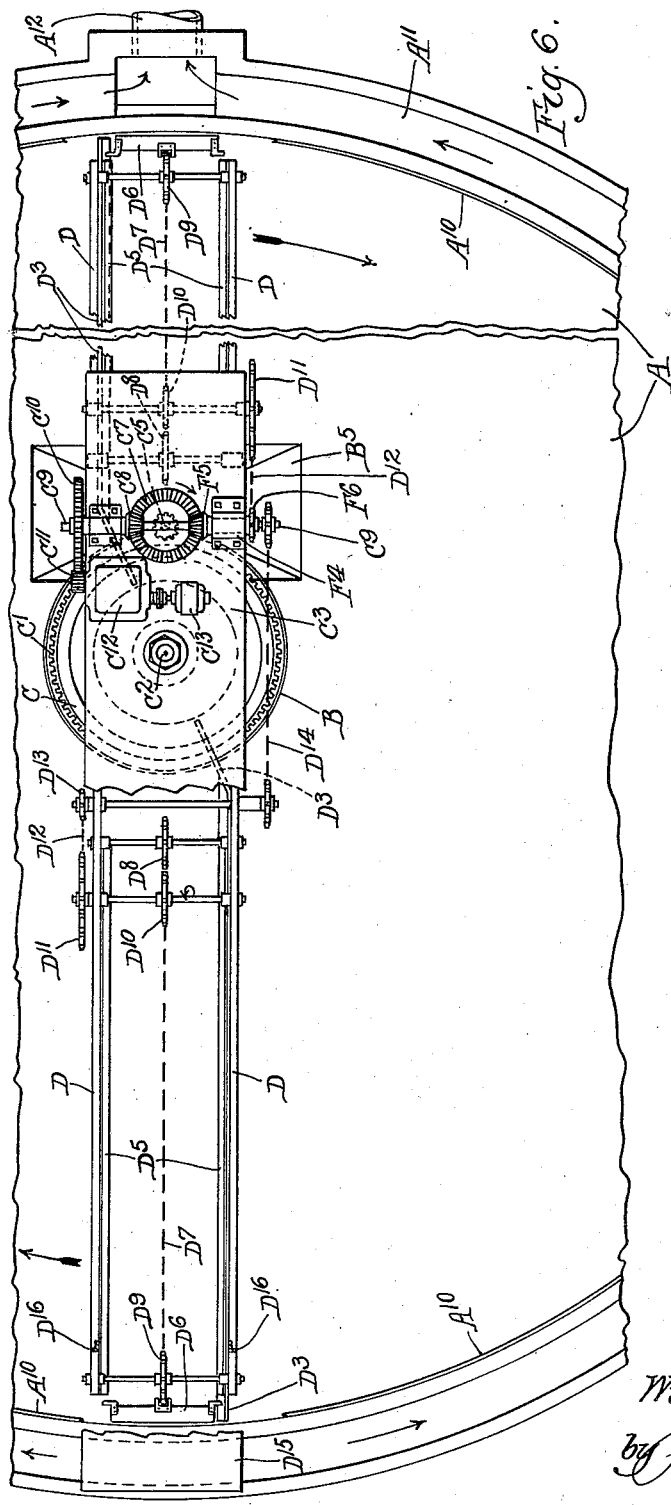
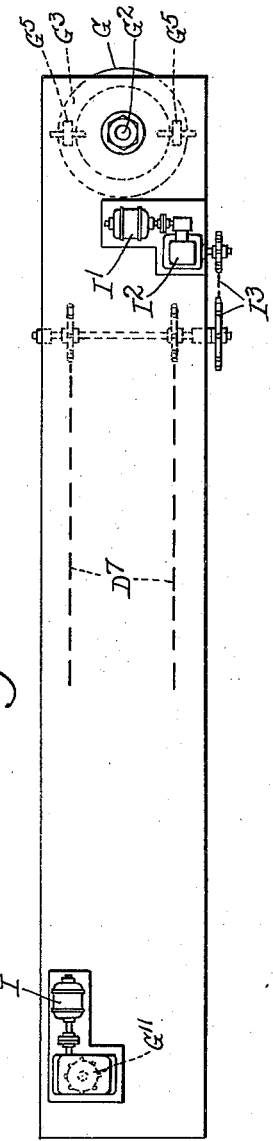
Inventor
William W. Sayers
by Parker & Carter
Attorneys.

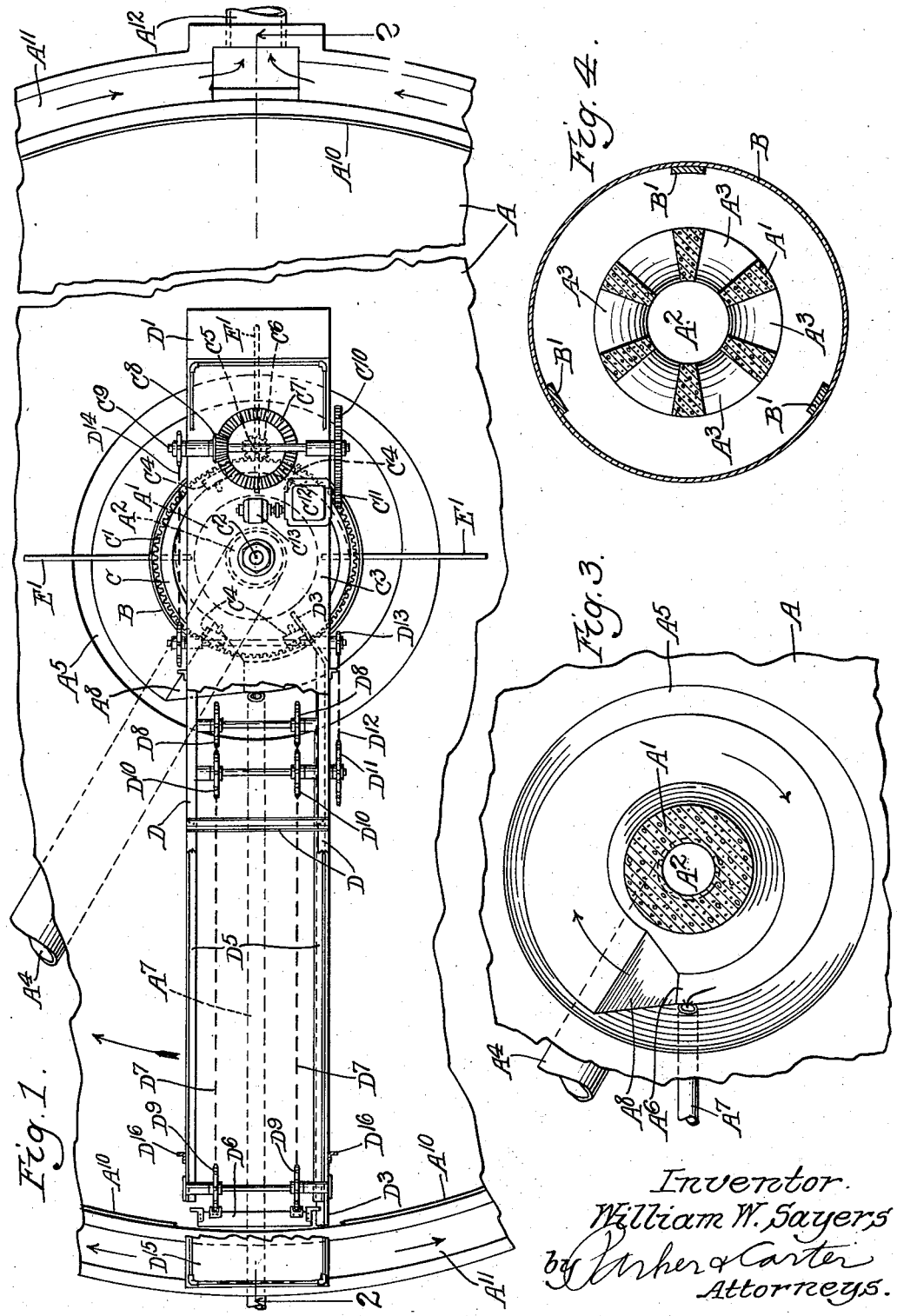

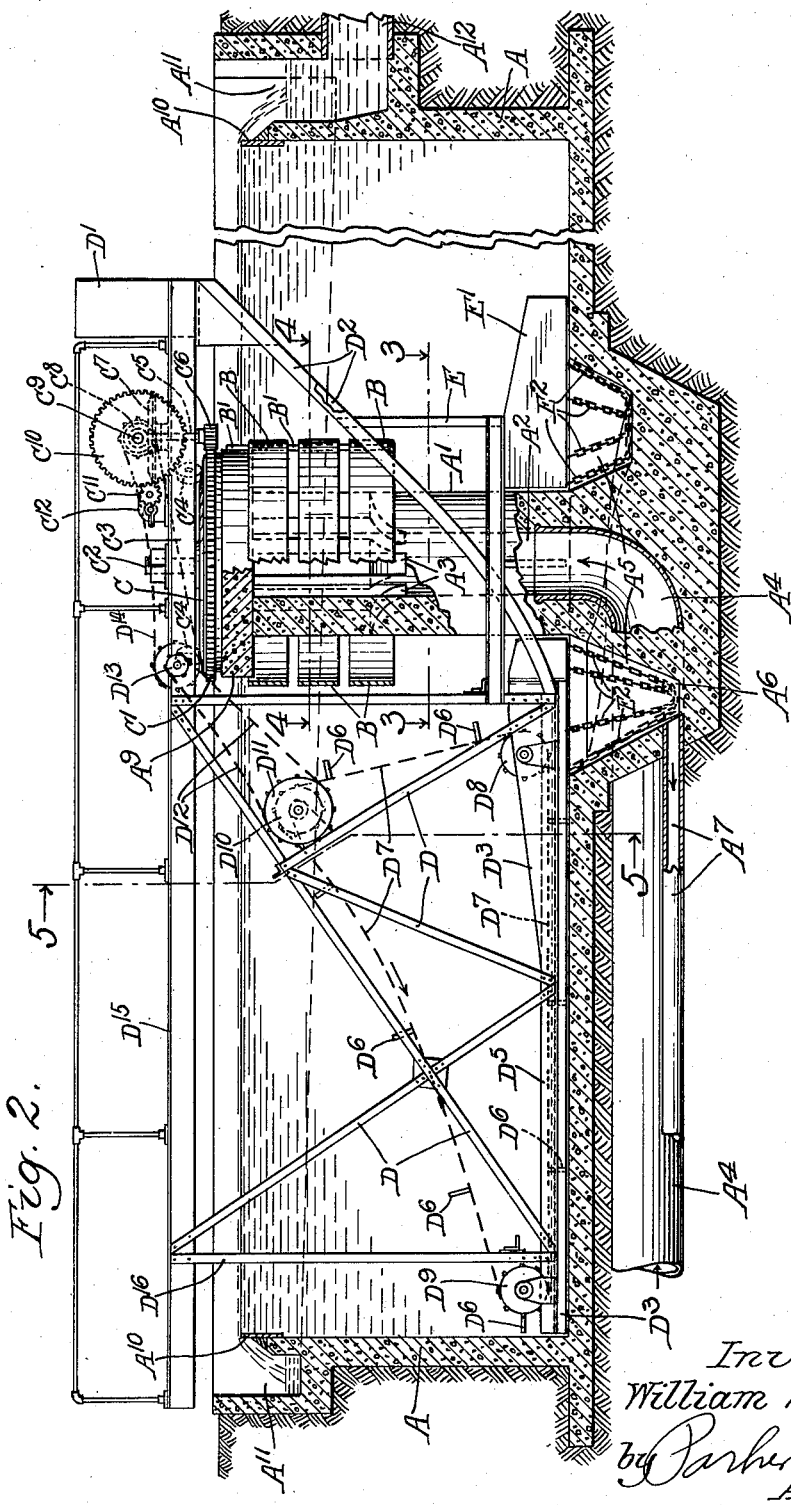

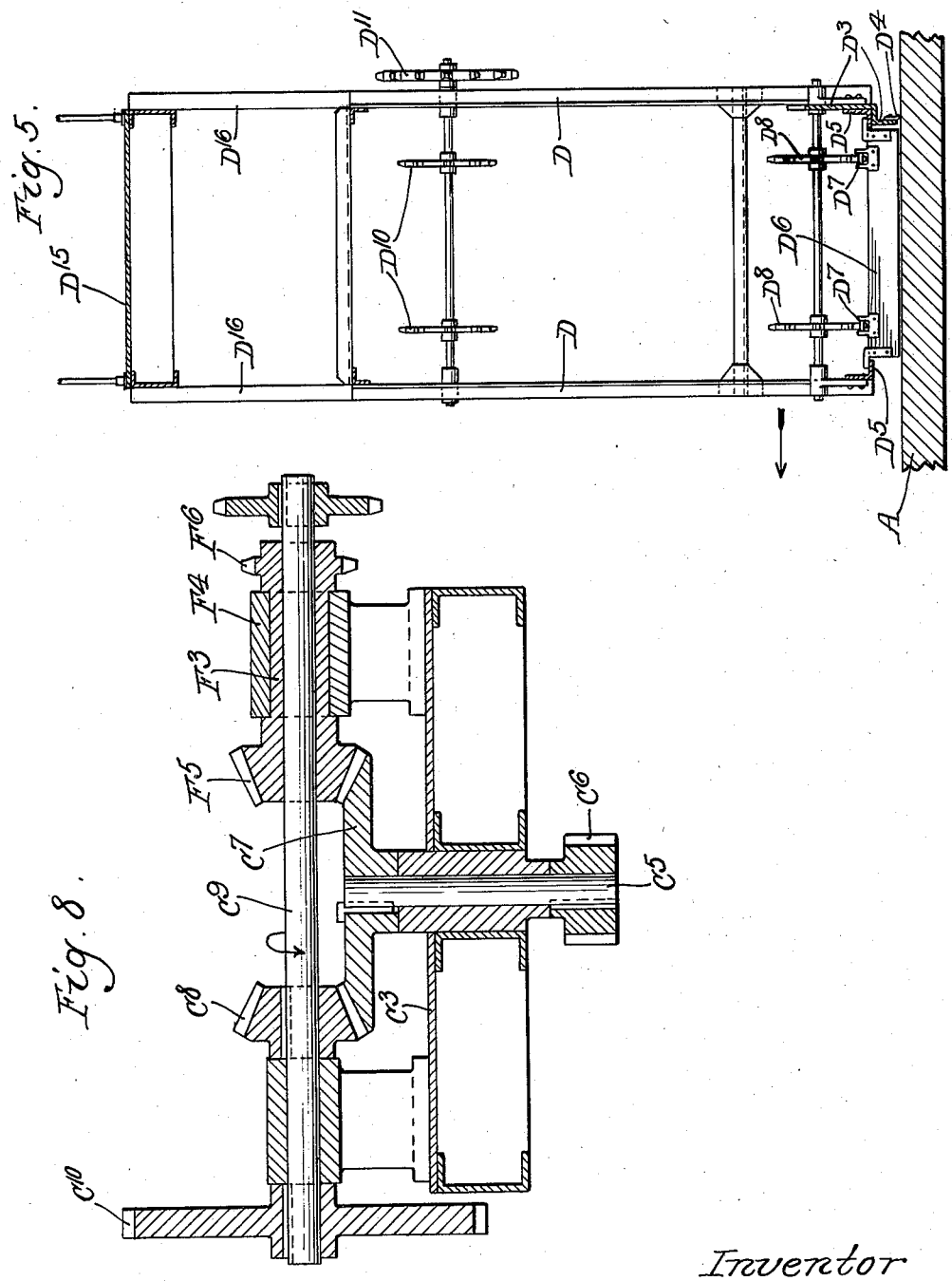

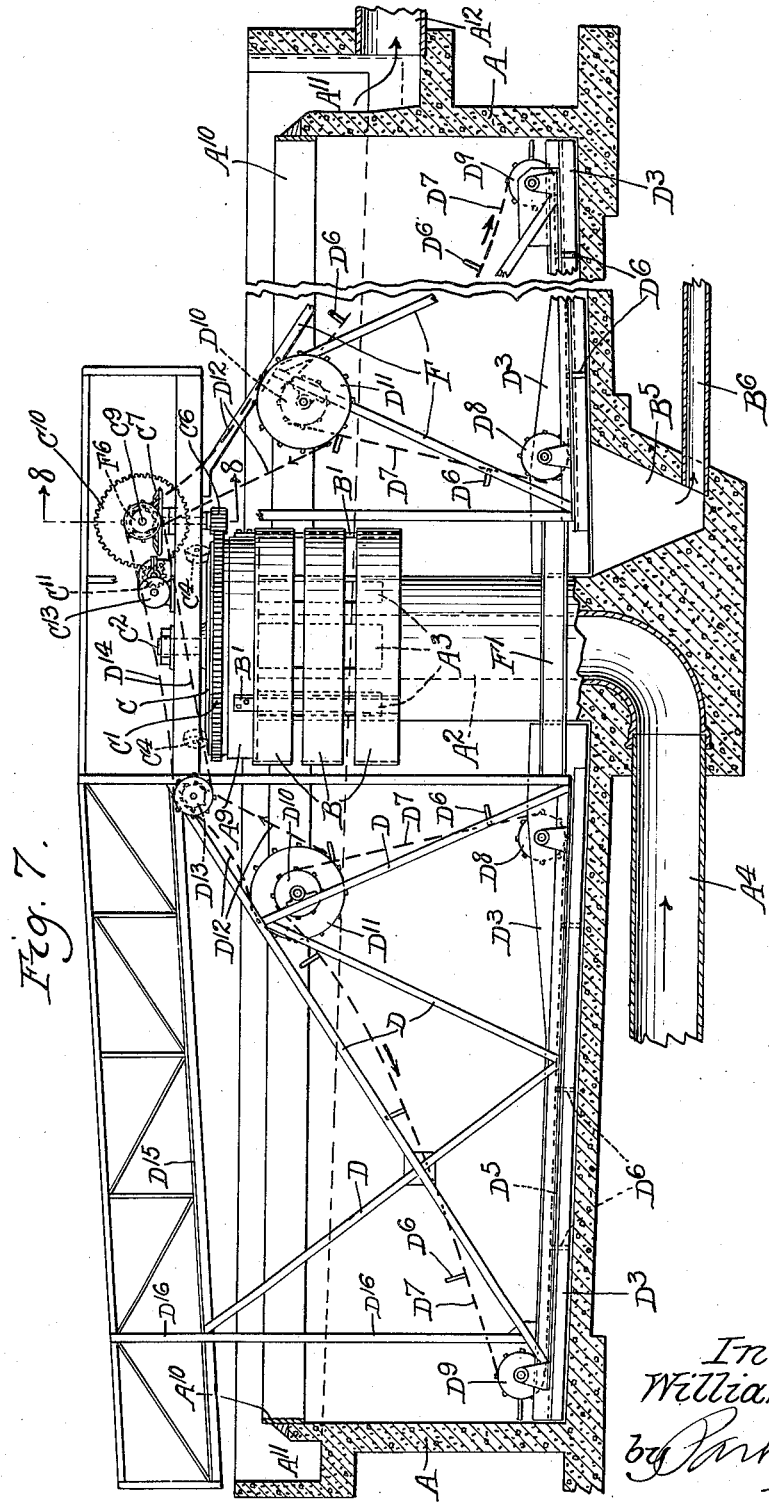

Dec. 15, 1936.  W. W. SAYERS  2,064,497
SETTLING TANK FOR SEWAGE AND THE LIKE
Filed Feb. 18, 1933  8 Sheets-Sheet 6
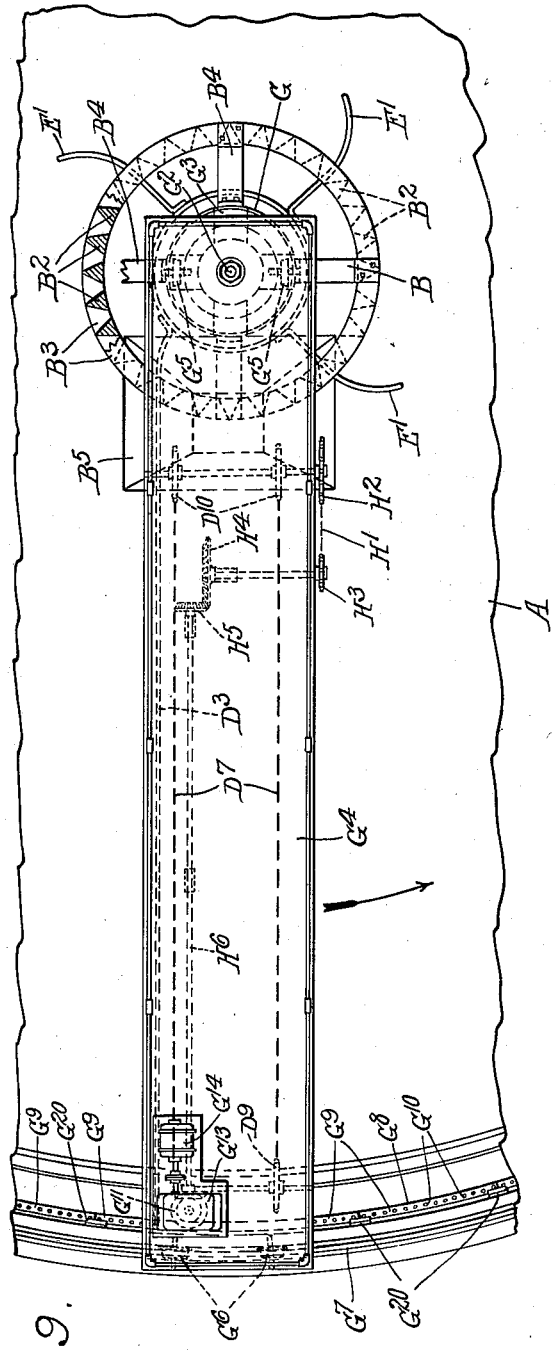
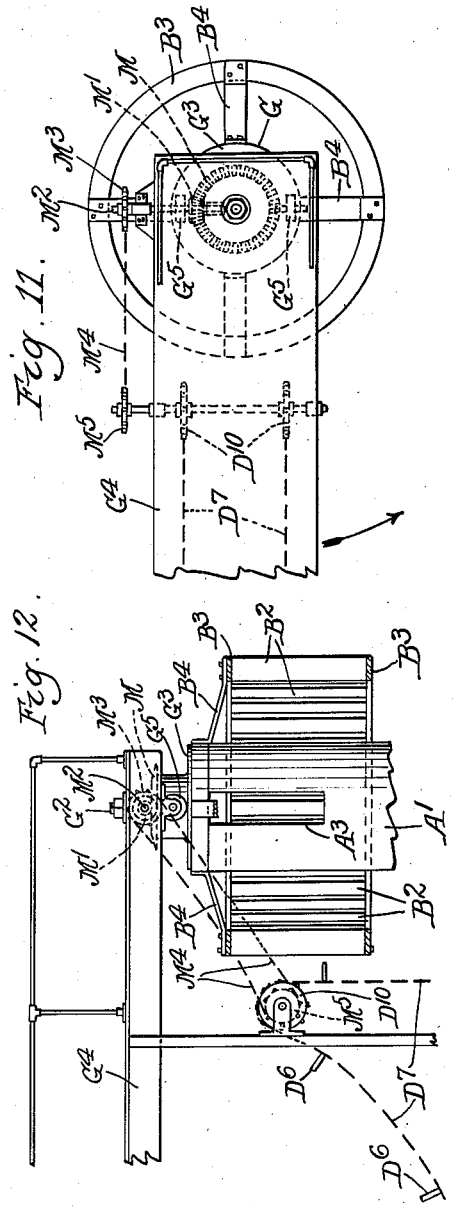
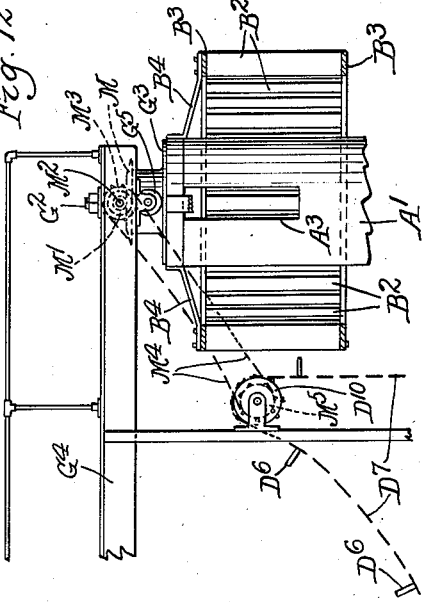
Inventor
William W. Sayers
by Parker & Carter
Attorneys.

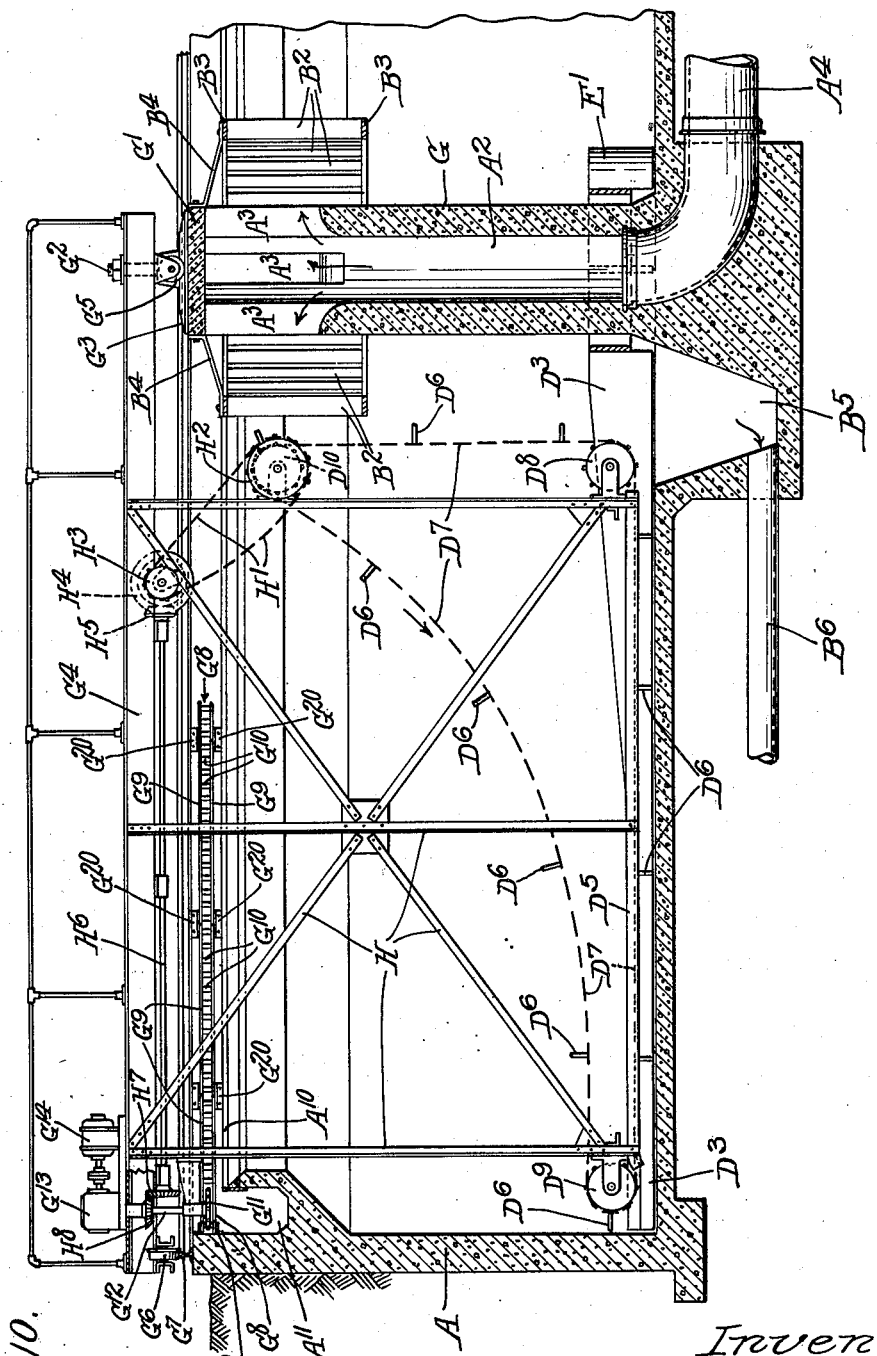

Dec. 15, 1936.  W. W. SAYERS  2,064,497
SETTLING TANK FOR SEWAGE AND THE LIKE
Filed Feb. 18, 1933    8 Sheets-Sheet 8

Inventor
William W. Sayers
by Parker & Carter
Attorneys.

Patented Dec. 15, 1936

2,064,497

UNITED STATES PATENT OFFICE 2,064,497

SETTLING TANK FOR SEWAGE AND THE LIKE

William W. Sayers, Chicago, Ill., assignor to Link-Belt Company, Chicago, Ill., a corporation of Illinois Application February 18, 1933, Serial No. 657,367

32 Claims. (Cl. 210—55)

My invention relates to improvements in settling tanks for use with sewage or any other fluid which contains in suspension solids which may be settled out. One object of the invention is to provide in combination a settling tank wherein the settled solids may be positively displaced after they have settled and be discharged from the tank. Another object is to provide in connection with a generally circular tank positive means for displacing settled solids radially. Another object is to provide in connection with a settling tank a movable mechanically operated positive means for propelling settled solids to a discharge point, wherein the movable means are progressively displaced for the purpose of bringing them into working relation with, during a complete cycle of operation, substantially all parts of the floor of the settling tank. Other objects will appear from time to time throughout the specification and claims.

My invention is illustrated more or less diagrammatically in the accompanying drawings, wherein—

Figure 1 is a plan view with parts omitted;

Figure 2 is a section along the line 2—2 of Figure 1;

Figure 3 is a section along the line 3—3 of Figure 2;

Figure 4 is a section along the line 4—4 of Figure 2;

Figure 5 is a section along the line 5—5 of Figure 2;

Figure 6 is a plan view of a modified form;

Figure 7 is a side elevation in part section of the device shown in Figure 6;

Figure 8 is a section on an enlarged scale along the line 8—8 of Figure 7;

Figure 9 is a plan view of a further modified form;

Figure 10 is a side elevation in part section of the device shown in Figure 9;

Figure 11 is a detail plan view showing a modified form of conveyor drive;

Figure 12 is a side elevation of the device shown in Figure 11 in part section;

Figure 13 is a plan view of the conveyor drive mechanism;

Like parts are indicated by like characters throughout the specification and drawings.

Figure 14:
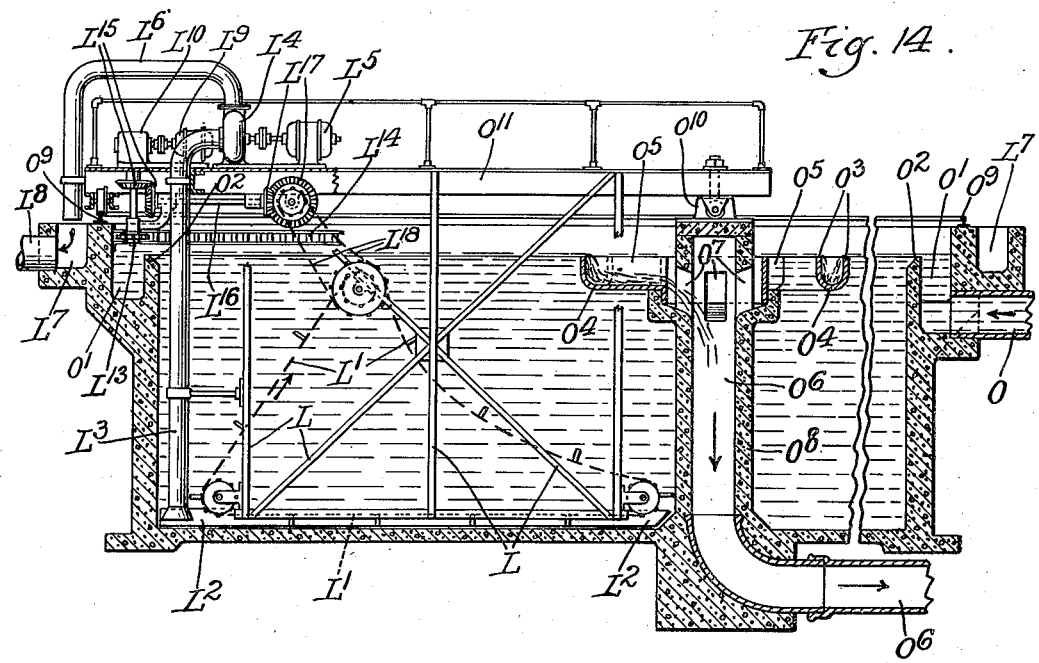
Figure 14 is a section through a settling tank showing a different form of sludge collecting means.

A is a settling tank. It is shown here for the purpose of convenience as being generally circular though it might be irregular or polygonal as desired. Projecting upwardly from the center of the tank or from a point within the periphery of the tank is a column $A^1$ preferably of concrete. This column contains the vertically disposed passage $A^2$ and has in communication with it, discharge ports or apertures $A^3$. $A^4$ is a supply pipe beneath the bottom of the tank communicating with the hollow passage $A^2$ in the concrete column post or pier. Surrounding the column $A^1$ is a discharge trough $A^5$. Reference to Figure 3 will show that this trough is shallowest above the pipe or conduit $A^4$, increases in width spirally to its low point at $A^6$ where it communicates with a discharge pipe $A^7$. There is a sudden decrease in depth from the low point as indicated at $A^8$. For convenience the hollow pier is provided with a laterally extended mushroom like cap, preferably of concrete, $A^9$. $A^{10}$ is a weir encircling the periphery of the tank, vertically adjustable and forming the upper boundary of the wall thereof. Encircling this weir is a discharge trough $A^{11}$ communicating with an effluent discharge pipe $A^{12}$. It will be understood that the fluid, containing material to be settled, enters through the pipe $A^4$, the hollow interior of the pier $A^2$, and is discharged through the ports $A^3$. The settled material is collected in the trough $A^5$ $A^6$ and discharged through the sludge pipe $A^7$ and the supernatant fluid flows over the weir $A^{10}$ into the trough $A^{11}$ and is discharged through the effluent pipe $A^{12}$.

Encircling the pier $A^1$ rigidly mounted in fixed position thereon in line with the discharge ports $A^3$ is a baffle made up of a plurality of horizontally disposed vertically spaced rings B, tied together by vertical members $B^1$ which depend from the cap $A^9$. This baffle for convenience is shown closed at the top though it might be open and is open at the bottom. The fluid coming in through the ports $A^3$ is checked and baffled so that there is an opportunity for considerable settling of material from the fluid immediately above the sludge trough $A^5$ $A^6$. This baffle is shown in more detail in Figures 2 and 4. A modified form of baffle is shown in Figures 9 and 10. In this case the baffle comprises a plurality of vertically disposed slats $B^2$ held together at top and bottom by horizontal rings $B^3$. The upper ring $B^3$ being supported from the top of the column by means of arms $B^4$. In this particular form the column does not have the laterally disposed head $A^9$ and so the baffle is open at the top but the two baffles may be used interchangeably with either type of column. In either case, the lower portion of the baffle is open and unobstructed so as not to interfere with the downward travel of the settling material. In Figures 6, 7, 9 and 10, is shown a modified form of sludge receiving hopper $B^5$ located adjacent one side of the pier generally rectangular in cross sectional area and communicating with a sludge discharge pipe $B^6$. The sludge discharge pipe may if desired extend in any direction with respect to the influent pipe.

The pier $A^1$ with its cap $A^9$ carries as shown in Figures 1 and 2 a conical roller race C. Arranged about the periphery of the roller race is a gear $C^1$, preferably though not necessarily integral with the race. $C^2$ is a king pin concentric with the roller race. $C^3$ is a turntable pivoted on the king pin $C^2$ and having a plurality, preferably four, conical rollers $C^4$ rotatably mounted thereon and engaging the roller race C. Rotatably mounted on the turntable is a shaft $C^5$ carrying a pinion $C^6$ in mesh with the gear $C^1$. The upper end of this shaft carries a bevel gear $C^7$ in mesh with a bevel pinion $C^8$ on a cross shaft $C^9$. This cross shaft $C^9$ carries a gear $C^{10}$ in mesh with a driving pinion $C^{11}$ driven by a reduction gear $C^{12}$ from a motor $C^{13}$ all on the turntable so that operation of the motor causes a rotary movement of the turntable on the supporting roller track.

Projecting laterally from one side of the turntable frame is a conveyor ladder D. This ladder extends downwardly toward the bottom of the tank and is radially disposed with respect to the pier $A^1$. $D^1$ is a counterweight on the opposed side of the turntable and the rear lower end of the ladder is braced by the cross members $D^2$, extending diagonally from the counter weight down to the lower inward end of the ladder but so positioned and spaced as to be altogether out of contact with the baffle. $D^3$ is a plow, scraper or screed carried by the conveyor ladder and extending from a point immediately adjacent the pier at one end to a point immediately adjacent the junction of the side wall and bottom of the tank at the other end. The plow is normally at its lower edge just out of contact with the floor of the tank and a flexible squeegee blade $D^4$ may be used if desired to engage the floor of the tank. $D^5$ indicates guide channels located just above the floor of the tank parallel with the scraper blade. Suspended and guided by these guide channels are a plurality of conveyor flights $D^6$ mounted on a two-strand conveyor chain $D^7$, which travels over sprockets $D^8$, $D^9$ and $D^{10}$. The sprockets $D^8$ $D^9$ are adjacent the floor of the tank, the sprocket $D^{10}$ being on the ladder above the floor of the tank but preferably immersed in the liquid contained therein. $D^{11}$ is a driving sprocket on the shaft which carries the sprockets $D^{10}$. It is driven by a chain $D^{12}$, large and small sprocket combination $D^{13}$ and chain $D^{14}$ from the cross shaft $C^9$ so that the conveyor flights or pushers $D^6$ are caused to travel along a radial path parallel with the scraper inwardly toward the center of rotation of the turntable and ladder so that material gathered near the bottom of the tank by the radial scraper $D^3$ is moved inwardly along that scraper and discharged into the sludge trough or hopper $A^5$ $A^6$ and since both the conveyor and the turntable are driven from the same source of power, they work in unison, $D^{15}$ is a walkway supported by means of the upright $D^{16}$ from the conveyor ladder D.

Mounted on a framework E depending downwardly from the diagonal cross braces $D^2$ are a plurality of outwardly extending vanes $E^1$ which may or may not extend out slightly beyond the outer periphery of the sludge trough $A^5$. They have for one purpose to distribute above the sludge trough the relatively denser or thicker blanket of suspended sludge which may settle adjacent the influent opening. They may also serve as a support for the loosely hanging agitator chains $E^2$ or other means which hang freely in the trough and are caused to travel around with the rotation of the turntable. These chains are long enough so that they reach substantially to the bottom of the deepest part of the trough and as the structure revolves, they exert a sufficient agitating and conveying effect to insure that sludge fed to the sludge trough will be conveyed around the trough from the shallower toward the deeper end so that the sludge will reach and flow out through the sludge discharge pipe. They also tend to prevent the accumulation of solids which may cause a septic condition when putrescible matter is present. It will be understood that while the angle of repose of settled sludge may be such that it would not flow downwardly along the gradually inclined bottom of the trough if left alone, when slightly agitated or disturbed by these chains or other flexible members as they pass along, a sufficient flow and movement of the sludge takes place to cause its discharge through outlet $A^7$.

In the modified form shown in Figures 6, 7 and 8, instead of having a single ladder associated with a counterbalance or counterweight, there are two ladders, the second ladder F being structurally the same as the ladder D above referred to, the two ladders being tied together by the cross braces $F^1$ which also are out of contact with the column or pier and with the baffle rings B. Since these ladders extend in opposite directions, it will be understood that a reverse drive is needed for the conveyor on the ladder F. This is accomplished by mounting the cross shaft $C^9$ at one end in a hollow sleeve $F^3$. This hollow sleeve $F^3$ is supported in the bearing $F^4$ and carries at one end a pinion $F^5$ in mesh with the gear $C^7$, at the other end, a drive sprocket $F^6$ so that the sprocket $F^6$ travels in a direction opposite to the direction of rotation of the shaft $C^9$.

In the modified form shown in Figures 9 and 10, the pier G does not have the laterally extended mushroom cap but is closed at its upper end as indicated at $G^1$ and carries a king pin $G^2$ and a conical roller track $G^3$ of substantially the outside diameter of the pier. $G^4$ is a bridge centered on the king pin $G^2$ having two rollers $G^5$ traveling along the conical track $G^3$. At the outer end of the bridge are a pair of track rollers $G^6$ traveling along the circular track $G^7$ on the top of the wall of the tank. $G^8$ is a rack adjacent the top of and the inner periphery of the wall. The rack is preferably made up of a plurality of curved flat bars $G^9$, which carry spaced tooth pins $G^{10}$ and have supporting brackets $G^{20}$ at intervals. In mesh with this rack is a pinion $G^{11}$ on a vertical shaft $G^{12}$ driven through a gear reduction $G^{13}$ by a motor $G^{14}$, the rotation of the pinion in mesh with the internal rack around the periphery of the tank causing the swinging movement of the bridge.

H is a conveyor ladder or frame downwardly depending from the bridge. It carries the plow, the end sprockets, the driving sprocket, the conveyor blades and chain combination as set out in connection with Figures 1 and 2. In this case the drive for the conveyor is through a chain $H^1$ which drives the sprocket $H^2$ on the conveyor driving sprocket shaft and is driven by a sprocket $H^3$ which sprocket in turn is driven by a bevel gear $H^4$, bevel pinion $H^5$, radial shaft $H^6$, bevel pinion $H^7$ and bevel gear $H^8$ on the vertical shaft $G^{12}$ so that here again the conveyor is driven in unison with and in proper relation with respect to the drive of the bridge.

In the modified form shown in Figures 11 and 12, the only difference from what has been referred to in connection with Figures 9 and 10, is that a fixed bevel gear M is located concentric with the roller track $G^3$. In mesh with it is a bevel pinion $M^1$ on a cross shaft $M^2$, which shaft carries a sprocket $M^3$ over which travels a chain $M^4$ driving a sprocket $M^5$ to drive the conveyor. In the modified form shown in Figure 13, two motors are used. The motor I is used to drive the bridge in its pivotal movement around the center and the motor $I^1$ driving through a gear reduction box $I^2$ and a chain and sprocket train $I^3$ to drive the conveyor as indicated.

I have illustrated a number of different types of bridge construction and ladder construction, a number of different means for supporting the structure; a number of different means for driving the bridge or ladder and for driving the conveyor. It will be understood that different combinations and assemblies of these different means can be built up and will be built up in the solving of the various problems entering into the design of a structure such as this. Further it will be noted that I have illustrated only a flight conveyor. Other types of conveyors, screw, reciprocating, brushing, raking and the like might equally well be mounted on the ladder or bridge as long as they are such as will move the material inwardly without setting up undue stirring action.

Figure 16:
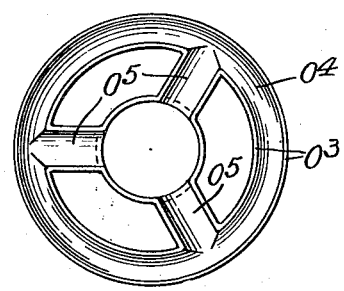
Figure 16 is a detail plan view of the device shown in Figure 14.
Figure 15:
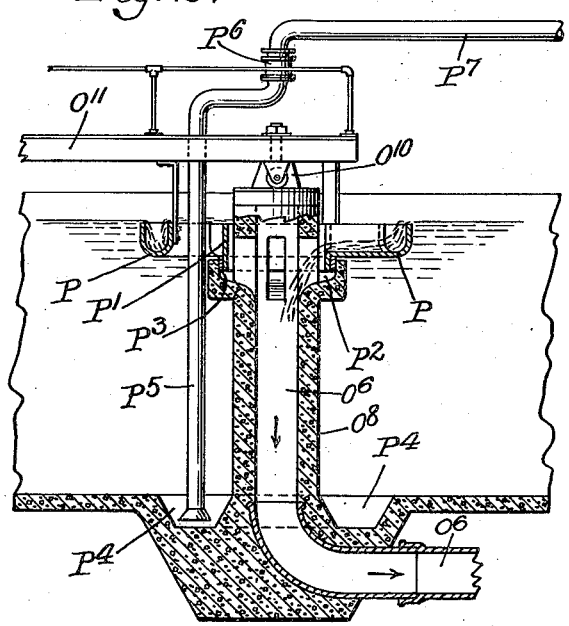
Figure 15 is a detail section through a part of a settling tank showing a still further modified form of sludge collecting means.

In the modified forms shown in Figures 14, 15 and 16 flow of the liquid into and out of the tank is radial but centripetal instead of centrifugal as in the other modifications. Influent comes in through the pipe O to the annular trough $O^1$, flows in over the weir $O^2$ into the tank, travels radially inward and is discharged over the inner and outer walls $O^3$ of the annular effluent channel $O^4$, thence radial passages $O^5$ carry it to the effluent pipe $O^6$ through ports $O^7$ in the central pier $O^8$. $O^9$ is a track about the periphery of the tank. $O^{10}$ is a central support on the top of the pier and $O^{11}$ is a bridge pivoted on the support $O^{10}$ at one end and traveling at its other end along the track $O^9$.

The bridge $O^{11}$ carries a downwardly depending conveyor ladder L supporting a conveyor $L^1$ and screed $L^2$. In this instance the conveyor flights move along the bottom of the tank in front of the face of the screed toward the outer periphery of the tank and discharge the sludge deposited on the bottom at the periphery thereof in the path of the section pipe $L^3$ which is carried on the bridge $O^{11}$. The pump $L^4$ driven by the motor $L^5$ draws the sludge out of the tank, through the pipe $L^3$ and discharges it through the pipe $L^6$ into the circular trough $L^7$ extending about the periphery of the tank. The sludge flows by gravity along this trough to and is discharged through the pipe $L^8$. A separate motor $L^9$ working through a gear reduction box $L^{10}$ drives the pinion $L^{13}$ in mesh with the rack gear $L^{14}$ to cause swinging or rotation of the bridge. The conveyor $L^1$ is driven from the bearing box $L^{10}$ through the bevel gears $L^{15}$, shaft $L^{16}$ and bevel gears $L^{17}$ and chain and sprocket combination $L^{18}$.

In the further modified form shown in Figure 15, the bridge $O^{11}$ carries the effluent trough P and there is associated with this effluent trough an extension $P^1$ rotating in the socket $P^2$ on the pier, there being packing means $P^3$ between them so that rotation of the effluent ring or trough may take place without interfering with the outflow of the liquid. Also in this instance a comparatively shallow hopper $P^4$ is used about the pier or center of the tank and this hopper is of substantially the same depth throughout. $P^5$ is a pipe carried on the bridge $O^{11}$ extending down to a point adjacent the bottom of the hopper and caused to travel along the bottom of the hopper by means of the bridge. This pipe extends up to the bridge and terminates in a gooseneck which in turn terminates in a swivel joint connection $P^6$ concentric with the bridge. A cross pipe $P^7$ is in working relation with this joint $P^6$ and extends out to and beyond the periphery of the tank. The pump to cause the suction may be placed anywhere along this pipe or of course may be dispensed with and material syphoned out if desired in the well-known manner.

The screed and the conveyor blades while they of course may engage the floor of the tank preferably will not do so but will just clear it. This is for the purpose of preventing wear and for the purpose of insuring that the relation between the screed and the conveyor blades and the tank floor will always be the same. If they do engage the bottom of the tank, it will preferably be by means of a flexible tip or squeegee which will support none of the weight of the mechanism. It is contemplated of course that the weight of the mechanism will be supported from above.

Because the radial movement of the settling material is caused by the conveyor flights and especially because normally a particle of material once collected by the conveyor flights and screed continues to move forwardly to the discharge without intermission, it is possible to operate the apparatus with the bridge making a much slower movement than is customary when intermittent or step by step propulsion of the settling material takes place. In the past it has been in some instances customary to provide a sweeping arm with a plurality of inclined rakes. This sweeping arm travels round and round the tank, the rakes gradually plowing the material toward the center or toward the periphery. This is a step by step action, each particle is propelled a short distance by one rake and then left for a succeeding rake on a succeeding arm to give it a further increment of movement. The result of this is that the tank floor is never entirely clean and in order that material may not remain too long in the tank for septic action to take place and in order to remove the solids at the necessary rate, it becomes essential in a device such as this that the bridge be given a relatively high rate of movement. This of course tends to set up eddy currents and tends to hinder the settling. In the device which I propose a very slow lateral displacement of the conveyor and supporting mechanism may take place because each particle collected is always carried to the discharge by a continuous movement. Preferably I propose to use the screed to pile up material to be acted upon by the conveyor but it is of course possible to accomplish the result without the screed. In this case each conveyor blade or paddle will move the particles of material forwardly and then release them having much the same step by step feed that is characteristic of the prior art above referred to but of course even so a much slower speed can be used because the radial as well as the tangential movement of the conveyor blade will result in a much more rapid feed toward the discharge even with a low angular rate of movement.

It will be noted that I have shown the tank floor both horizontal and inclined. I have shown a tank floor both with and without a sludge trough. My apparatus is applicable to each of these arrangments or to a combination of them. It might even be possible to have the tank floor inclined throughout the remainder. I have shown in one instance movement of the effluent from the periphery inwardly. In most instances I have shown it from the center outwardly. I have shown the sludge withdrawn at the periphery and at the center. Obviously either arrangement for the inflow and outflow of the liquid and for the withdrawal of the sludge might be used in combination with the others. It makes no difference so far as the operation of my device is concerned whether the movement of the sludge is centrifugal or centripetal.

It will be instantly understood that an arrangement by which each particle from the time it is collected by the conveying mechanism until the time of its discharge is never allowed to come to rest, does result in a positive complete cleaning of the tank as a result of a comparatively small number of revolutions, or even one revolution only of the conveying mechanism so that there is no opportunity for putrescible material to remain long enough in the tank to set up septic action.

The use and operation of my invention are as follows:

Sewage or other liquid is introduced into the tank through the central fixed discharge column in such wise that the annular baffle plates encircling the radial discharge openings of the column will tend to check the movement of the solid particles in suspension, will tend to guide them downwardly whereby a material proportion of the solids will be settled out adjacent and generally surrounding the inflow ports. The tank will, of course, at all times be substantially filled with liquid and as the liquid is continually supplied at the center, it will run off over the weir encircling the tank, thus the flow of the liquid is generally radial. Since the size of the tank is properly proportioned with the rate of inflow, the velocity will be low enough so that the solids will settle to the bottom throughout the entire area of the tank.

The bridge which is supported wholly or partially on the central pier will be slowly rotated so that it sweeps the entire area of the floor of the settling tank. The radial screed carried by the bridge will tend to sweep over the entire area of the tank but will have no tendency to move the settled solids radially toward the discharge. The main purpose of the screed is to pile up material for the conveyor to act upon.

The conveyor will operate in unison and simultaneously with the radial travel of the bridge and screed and propel the material, piled up by the screed inwardly toward the center of the tank. It will be understood that the movement of bridge and screed and the rates of travel of the conveyor flights is exceedingly slow so that any individual particle gathered up by the conveyor will have a considerable spiral excursion before it reaches the central discharge point.

The purpose of mounting the conveyor so that it travels over three sprockets is to bring the drive sprocket up toward the top of the tank and to provide a relatively long unsupported strand of the conveyor so that the weight of the conveyor chain will take up the slack and obviate the necessity of any separate take up. The screed when used may or may not be mounted so that it is just in contact with the bottom of the tank. The same is true of the conveyor flights as they are supported on the bridge so as to minimize wear between the conveyor flights and the bottom of the tank and maintain a substantially constant relation between the screed and the conveyor flights and the tank bottom to insure proper cleaning.

The material which is urged radially toward the center of the tank will be discharged into the discharge pocket at the bottom of the tank whether that is segmental or extends entirely about the central part of the pier, or may be deposited on the floor if the pocket is not used. If the pocket does extend about the central part of the pier then chains or other suitable means are supported to drag or move in the pocket to urge the material to flow toward the discharge. A very slight effect in this connection is needed because the inclined floor of the pocket together with the outflow of the liquid through the discharge is in some instances sufficient to actually promote discharge flow without assistance.

In the modified form of the device where the two conveyor ladders are balanced on the center pier, the operation is identical except that the bottom of the tank is swept twice on each full rotation of the apparatus and of course the two conveyors drive in opposite directions, each moving its load of settled or settling material toward the discharge.

In the further modified forms where the outboard end of the bridge is supported on the track about the periphery of the tank, it will be understood that both the track and the curved rack will be fixed in place. The track and rack may be independently mounted or mounted together as the case may be. A positive drive is thus obtained and in this case the drive for the conveyor will normally come instead of from the center, from the swinging driving means located at the outer periphery of the tank. In any event it will be noted that the drive is independent of the supporting means for the bridge, that is the supporting rollers which carry the outboard end of the bridge or the supporting members which carry the inboard end of the bridge are merely anti-friction supporting members and the means to drive the bridge are separate from and do not drive through the anti-friction supporting members.

I claim:

1. In a settling tank, means movable radially and tangentially with respect to the center of and associated with the bottom of the tank for propelling material adjacent the bottom thereof continuously and uninterruptedly along a spiral path from the point at which it is collected to a discharge adjacent the center of the tank, said means including a conveyor and means for moving it radially of the tank.

2. In a settling tank, means radially and tangentially movable associated with the bottom thereof for propelling material adjacent the bottom thereof continuously along a spiral path from the point at which it is collected to a discharge adjacent the center of the tank, said means comprising a radially disposed scraper blade and a conveyor both mounted to rotate in unison about a center within the tank, the conveyor having flights mounted for radial movement toward such center.

3. In a settling tank, means radially and tangentially movable associated with the bottom thereof for propelling material adjacent the bottom thereof continuously along a spiral path from the point at which it is collected to a discharge adjacent the center of the tank, said means comprising a radially disposed scraper blade mounted to rotate about a center within the tank and means for propelling material along the bottom of the tank radially toward the discharge immediately in front of the scraper.

4. In a settling tank, means radially and tangentially movable associated with the bottom thereof for propelling material adjacent the bottom thereof toward a discharge adjacent the center of the tank, said means including a conveyor mounted to swing about a vertical center line within the tank having flights mounted for radial movement toward such center.

5. In a settling tank, means radially and tangentially movable associated with the bottom thereof for propelling material adjacent the bottom thereof toward a discharge adjacent the center of the tank, said means including a conveyor mounted to swing about a vertical center line within the tank having flights mounted for radial movement toward such center, a single driving means for simultaneously swinging the conveyor and for moving the conveyor flights toward the center in coordination with the swinging movement.

6. In a settling tank, a frame and means for swinging it about the center of the tank whereby it sweeps substantially the entire floor area of the tank, means carried by the frame for displacing the material adjacent the floor of the tank in the swept area radially and separate means for displacing such material tangentially, said separate means being adapted to continuously propel such material toward the center of the tank.

7. In a settling tank, a movable radially disposed frame supported adjacent the center and the periphery of the tank, positive means located adjacent the periphery of the tank for rotating the frame about the center, a radially disposed scraper carried by the frame and means located in front of the scraper for positively displacing settled material toward the center of the tank.

8. In a settling tank, a radially disposed scraper, a conveyor mounted for movement along a radial path adjacent thereto, means for rotating the scraper and the conveyor about a vertical center line in the tank whereby each material particle contacted by the scraper conveyor combination has imparted to it a continuous forward spiral movement from the point at which it is gathered to a discharge hopper.

9. In a settling tank, a central vertically disposed pier having a plurality of radial apertures, a liquid supply passage extending through the pier and terminating at the apertures and an apertured baffle member encircling the pier spaced therefrom and in line with the apertures therein, the baffle being open at the bottom and comprising a plurality of generally concentric annular rings vertically spaced one from the other.

10. In a settling tank, a central vertically disposed pier having a plurality of radial apertures, a liquid supply passage extending through the pier and terminating at the aperture and an apertured baffle member encircling the pier spaced therefrom and in line with the apertures therein, the baffle being open and terminating at the bottom in a plane widely spaced above the bottom of the tank and fixed in position to encircle the pier.

11. In a settling tank, a centrally disposed vertical pier, a conical roller race fixed in position thereon, a gear encircling the race, a turntable, a plurality of supporting rollers adapted to rotate between the turntable and the roller race, a king pin concentric with the roller race and with the turntable, a pinion carried by the turntable in mesh with the gear and a drive means on the turntable for rotating the pinion to cause rotation of the turntable with respect to the roller race, a bridge projecting radially from the pier supported by the turntable and means carried by the bridge for displacing the settling material in the tank.

12. In a settling tank, a centrally disposed vertical pier, a conical roller race fixed in position thereon, a gear encircling the race, a turntable, a plurality of supporting rollers adapted to rotate between the turntable and the race, a king pin concentric with the race and with the turntable, a pinion carried by the turntable in mesh with the gear and a drive means on the turntable for rotating the pinion to cause rotation of the turntable with respect to the race, a bridge projecting radially from the pier supported by the turntable and means carried by the bridge for displacing the settling material in the tank and means on the side of the turntable opposed to the bridge for counterbalancing it.

13. In a settling tank, a solids collecting hopper, a centrally disposed vertical pier, a conical roller race fixed in position thereon, a gear encircling the race, a turntable, a plurality of supporting rollers adapted to rotate between the turntable and the race, a king pin concentric with the roller race and with the turntable, a pinion carried by the turntable in mesh with the gear and a drive means on the turntable for rotating the pinion to cause rotation of the turntable with respect to the roller race, a bridge projecting radially from the pier supported by the turntable and means carried by the bridge for displacing the settling material in the tank, said means comprising a conveyor having a movable element adapted to propel material along the bottom of the tank toward the collecting hopper.

14. In a settling tank, a solids collecting hopper, a centrally disposed vertical pier, a conical roller race fixed in position thereon, a gear encircling the race, a turntable, a plurality of supporting rollers adapted to rotate between the turntable and the race, a king pin concentric with the race and with the turntable, a pinion carried by the turntable in mesh with the gear and a drive means on the turntable for rotating the pinion to cause rotation of the turntable with respect to the race, a bridge projecting radially from the pier supported by the turntable and means carried by the bridge for displacing the settling material in the tank, said means comprising a conveyor having a movable element adapted to propel material along the bottom of the tank toward the collecting hopper, and means for operating said propeller in consonance with the rotary movement of the turntable.

15. In a settling tank, a conveyor ladder, a flight conveyor mounted thereon, end sprockets for the flight conveyor adjacent the bottom of the tank, an intermediate sprocket on the ladder at a point above the tank bottom but beneath the level of the liquid in the tank, means above the level of the liquid for driving the conveyor and a connection between such means and the drive sprocket, the conveyor chain hanging freely between the intermediate sprocket and the end sprockets, guide means interposed between the end sprockets for guiding the conveyor flights, and means for displacing the ladder along the bottom of the tank whereby the conveyor is caused as it operates to sweep a relatively extended area.

16. In a settling tank, means movable radially and tangentially with respect to the center of and associated with the bottom of the tank for propelling material deposited thereon continuously and uninterruptedly along a spiral path from the point at which it is collected to a discharge, said means comprising a plurality of conveyors and means for moving one of them radially of the tank.

17. In a settling tank, means radially and tangentially movable associated with the bottom thereof for propelling material adjacent the bottom thereof continuously along a spiral path from the point at which it is collected to a discharge, said means comprising a radially disposed scraper blade and a conveyor both mounted to rotate in unison about a center within the tank, the conveyor having flights mounted for radial movement.

18. In a settling tank, means radially and tangentially movable associated with the bottom thereof for propelling material adjacent the bottom thereof continuously along a spiral path from the point at which it is collected to a discharge, said means comprising a radially disposed scraper blade mounted to rotate about a center within the tank and means for propelling material along the bottom of the tank radially toward the discharge immediately in front of the scraper.

19. In a settling tank, means radially and tangentially movable associated with the bottom thereof for propelling material adjacent the bottom thereof toward a discharge, said means including a conveyor mounted to rotate about a center within the tank and having flights mounted for radial movement.

20. In a settling tank, sweeping means adapted for rotation about a center within the tank, moving conveyor means adapted to travel with the sweeping means for radially displacing settling material, means adjacent the discharge end of the conveyor for withdrawing the settling material from the tank as it is delivered by the conveyor, said withdrawing means comprising a pipe having a suction end terminating adjacent the bottom of the tank and means for discharging material therefrom continuously independent of the movement of the suction pipe in the tank.

21. In a settling tank, a bridge mounted for movement about a center within the tank, a conveyor carried thereby adapted to displace settling material adjacent the bottom of the tank along radial lines, a suction pipe carried by the bridge having its intake end adjacent the bottom of the tank and the discharge end of the conveyor, means for drawing settling material through the pipe and discharging it from the tank independent of the position of the pipe.

22. In a settling tank, a bridge mounted for movement about a center within the tank, a conveyor carried thereby adapted to displace settling material adjacent the bottom of the tank along radial lines, a suction pipe carried by the bridge having its intake end adjacent the bottom of the tank and the discharge end of the conveyor, means for drawing settling material through the pipe and discharging it from the tank independent of the position of the pipe, said means comprising a sealed rotatable pipe joint connection concentric with the center of rotation of the bridge, a connection between it and the suction pipe and a conduit leading from it to a point beyond the periphery of the tank.

23. In a settling tank, means movable radially and tangentially with respect to the center of and associated with the bottom of the tank for propelling material adjacent the bottom thereof continuously along a spiral path from the point at which it is collected to a discharge adjacent the center of the tank, said means comprising a radially disposed scraper blade mounted to rotate about a center within the tank and means for propelling material along the bottom of the tank radially toward the discharge immediately in front of the scraper, the scraper increasing in thickness from the periphery toward the center of the tank.

24. In a settling tank, a movable radially disposed frame supported adjacent the center and the periphery of the tank, positive means located adjacent the periphery of the tank for rotating the frame about the center, a radially disposed scraper carried by the frame and means located in front of the scraper for positively displacing settled material toward the center of the tank, the scraper increasing in thickness from the periphery toward the center of the tank.

25. In a settling tank, means movable radially and tangentially with respect to the center of and associated with the bottom of the tank for propelling material adjacent the bottom thereof continuously along a spiral path from the point at which it is collected to a discharge, said means comprising a radially disposed scraper blade whose width is increased in the direction of movement of the conveyor flights, and a conveyor both mounted to rotate in unison about a center within the tank, the conveyor having flights mounted for movement radially to the tank.

26. In a settling tank, means movable radially and tangentially with respect to the center of and associated with the bottom of the tank for propelling material adjacent the bottom thereof toward a discharge, said means including a conveyor mounted to rotate about a center within the tank having flights mounted for radial movement, and a radial scraper immediately adjacent the bottom of the tank and increasing in width toward the center of rotation.

27. In a settling tank, a floor adapted to receive settled material, a tank wall and a generally central hopper so related as together to bound the entire floor area, a single conveyor ladder supported in general parallelism with the floor, extending from the wall to the hopper, means for conveying it, along the floor to cause it to sweep the entire area thereof, a single scraper conveyor on the ladder having flights adapted to travel along the floor in a direction generally parallel with the axis of the ladder and to propel settled material along the floor toward the hopper.

28. In a settling tank, a floor adapted to receive settled material, a tank wall and a generally central hopper so related as together to bound the entire floor area, a single conveyor ladder supported in general parallelism with the floor, extending from the wall to the hopper, means for swinging it along the floor to cause it to sweep the entire area thereof, a single scraper conveyor on the ladder having flights adapted to travel along the floor in a direction generally transverse to the direction of movement of the ladder.

29. In a settling tank, a floor adapted to receive settled material, a tank wall and a hopper so related as together to bound the entire floor area, a single conveyor ladder supported in general parallelism with the floor, extending from the wall to the hopper, means for swinging it about a central axis along the floor to cause it to sweep the entire area thereof, a single scraper conveyor on the ladder having flights adapted to travel along the floor in a direction generally parallel with the axis of the ladder and to propel settled material along the floor toward the hopper, the ladder being adapted in one complete excursion to travel about the entire periphery of the wall bounding the tank.

30. In a settling tank, a floor adapted to receive settled material, a tank wall and a generally central hopper so related as together to bound the entire floor area, a single conveyor ladder supported in general parallelism with the floor, extending from the wall to the hopper, means for conveying it along the floor to cause it to sweep the entire area thereof, a single scraper conveyor on the ladder having flights adapted to travel along the floor in a direction generally transverse to the direction of movement of the ladder, the ladder being adapted in one complete excursion to travel about the entire periphery of the wall bounding the tank.

31. In a settling tank, means radially and tangentially movable with respect to the center of and associated with the bottom of the tank for propelling material adjacent the bottom thereof continuously along a spiral path from the point at which it is collected to a discharge adjacent the center of the tank, and means for imparting to the propelling means a continuous radial movement in the same direction during its entire cycle of movement tangentially about the tank.

32. In a settling tank, means movable radially and tangentially with respect to the center of and associated with the bottom of the tank for propelling material adjacent the bottom thereof continuously along a spiral path from the point at which it is collected to a discharge adjacent the center of the tank, said means comprising a radially disposed scraper blade mounted to rotate about a center within the tank and means for propelling material along the bottom of the tank radially toward the discharge immediately in front of the scraper.

WILLIAM W. SAYERS.